United States Patent
Ishikawa et al.

(10) Patent No.: US 7,543,357 B2
(45) Date of Patent: Jun. 9, 2009

(54) FOLDING DEVICE AND METHOD OF MOUNTING THE SAME

(75) Inventors: Takayuki Ishikawa, Tsuruga (JP); Koji Sakai, Tsuruga (JP); Masaki Nakase, Obama (JP)

(73) Assignee: Panasonic Corporation, Osaka (JP)

( * ) Notice: Subject to any disclaimer, the term of this patent is extended or adjusted under 35 U.S.C. 154(b) by 538 days.

(21) Appl. No.: 10/965,857

(22) Filed: Oct. 18, 2004

(65) Prior Publication Data
US 2005/0153752 A1 Jul. 14, 2005

(30) Foreign Application Priority Data
Jan. 14, 2004 (JP) ............... 2004-006568

(51) Int. Cl.
*E05F 1/08* (2006.01)
(52) U.S. Cl. ........................................ 16/303
(58) Field of Classification Search .......... 16/303, 16/327–330; 379/433.13; 455/575.3; 361/680–683, 361/801–804
See application file for complete search history.

(56) References Cited

U.S. PATENT DOCUMENTS

| | | | | |
|---|---|---|---|---|
| 5,109,571 A | * | 5/1992 | Ohshima et al. .............. | 16/307 |
| 6,141,831 A | * | 11/2000 | Novin et al. .................. | 16/330 |
| 6,772,481 B2 | * | 8/2004 | Oshima et al. ................ | 16/330 |
| 6,886,221 B2 | * | 5/2005 | Minami et al. ................ | 16/324 |
| 6,904,644 B2 | * | 6/2005 | Oshima et al. ................ | 16/330 |
| 7,085,375 B2 | * | 8/2006 | Katoh .......................... | 16/303 |
| 7,171,247 B2 | * | 1/2007 | Han ............................. | 16/303 |
| 7,383,616 B2 | * | 6/2008 | Duan et al. ................... | 16/303 |
| 2005/0108853 A1 | * | 5/2005 | Lee ............................. | 16/330 |

FOREIGN PATENT DOCUMENTS

JP 2002-089542 3/2002

\* cited by examiner

*Primary Examiner*—Robert J Sandy
*Assistant Examiner*—Ruth C Rodriguez
(74) *Attorney, Agent, or Firm*—Wenderoth, Lind & Ponack, L.L.P.

(57) ABSTRACT

A folding device is constructed with a holding member mounted rotatably on an end portion of a movable case, which is formed on its periphery with a convex wall portion or a concave groove portion, and which houses a fixed member and a movable member. A holding member provided in the folding device is rotated to fix the movable case in a movable housing of, for example, an electronic apparatus after the movable case is inserted in the movable housing.

11 Claims, 8 Drawing Sheets

FOLDING DEVICE AND METHOD OF MOUNTING THE SAME

FIELD OF THE INVENTION

The present invention relates to a folding device for use in various electronic apparatuses such as mobile telephones and personal computers, and to a method of mounting the same.

BACKGROUND OF THE INVENTION

Recently, there has been great advancement in production of miniature and lightweight electronic apparatuses such as mobile telephones and personal computers. In accordance therewith, such apparatuses having movable housings arranged to be opened and closed with respect to fixed housings, i.e., folding type apparatuses, are increasing in number. A folding device used for such apparatuses is required to be low in cost and easy to use.

Such conventional folding device and a method of mounting the same will be described with reference to FIG. 3 and FIG. 7 to FIG. 9.

In a sectional view of the drawings, the dimension is shown elongated in the radial direction to make easy the understanding of the relationship between a fixed cam and a movable cam.

Figure 7:
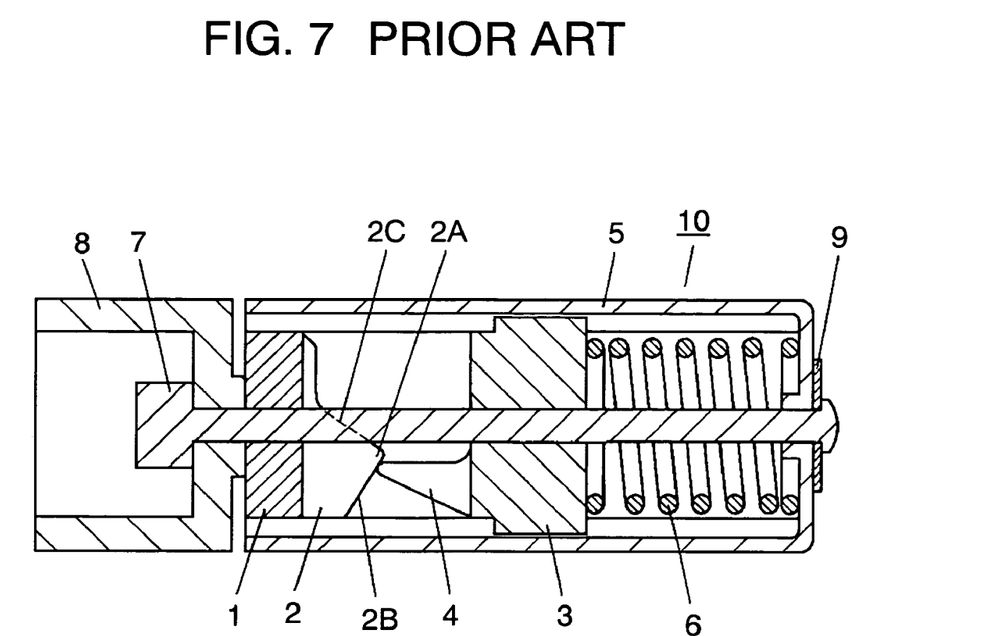
FIG. 7 is a sectional view of a conventional folding device.
Figure 8:
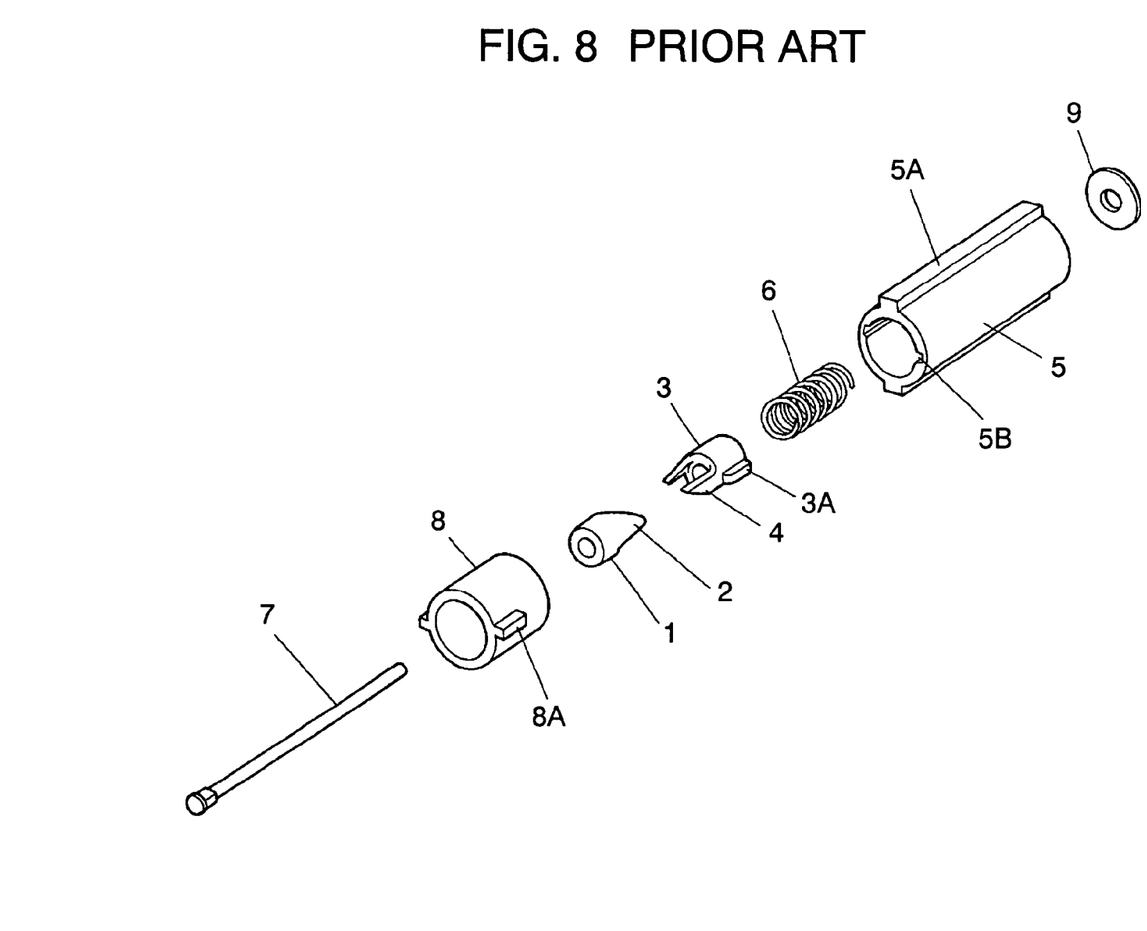
FIG. 8 is an exploded view in perspective of a conventional folding device.

FIG. 7 and FIG. 8 are a sectional view and an exploded view in perspective of a conventional folding device.

Metal fixed member 1 in a substantially cylindrical shape is provided with fixed cam 2 on a periphery of its right-hand side face. Fixed cam 2 comprises protruded portion 2A and two sloped portions 2B and 2C extending upwardly and downwardly from protruded portion 2A.

Further, metal movable member 3, which is also in a substantially cylindrical shape, is arranged for rotation in an opening and closing direction with respect to fixed member 1. Movable member 3 is provided with movable cam 4 on a periphery of its left-hand side face (as shown in FIG. 7) in confronting relation with fixed cam 2.

Movable case 5, which is in a substantially cylindrical shape and made of sintered alloy, is provided with convex wall portion 5A sticking outward on its outer periphery and guide groove 5B on its inner periphery. Protrusion 3A provided on the outer periphery of movable member 3 is inserted into guide groove 5B so that movable member 3 is held for movement in an axial direction.

Further, coil spring 6 is mounted so as to be weakly precompressed in a space between a right-hand side face of movable member 3 and a right-hand bottom face of movable case 5. Spring 6 urges movable member 3 leftward, and thereby, a tip end of movable cam 4 is held in resilient contact with sloped portion 2B of fixed cam 2.

Fixed case 8, which is in a substantially cylindrical shape, and fixed member 1 are fixed to a left end portion of fixed shaft 7 which has a substantially circular pillar shape. Moreover, a right end portion of fixed shaft 7 passes through a hollow portion of movable member 3 and spring 6 to be rotatably mounted to a right-hand face of movable case 5 by means of locking ring 9.

Fixed case 8, provided on its outer periphery with convex wall portion 8A, is rotatably mounted to a left-hand side face of movable case 5 by means of fixed shaft 7.

Folding device 10 is thus constructed with fixed member 1, movable member 3, spring 6 and the like housed in movable case 5.

Figure 3:
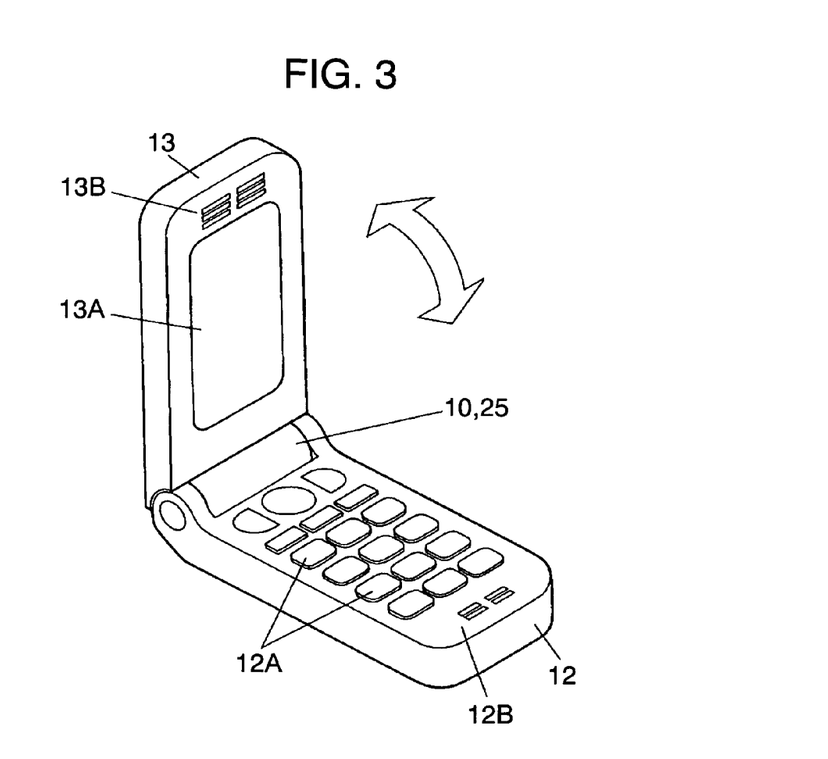
FIG. 3 is a perspective view of a mobile telephone as an example of an electronic apparatus.

Fixed case 8 of folding device 10 is fixed to fixed housing 12 while movable case 5 is fixed to movable housing 13, respectively, as shown in the perspective view of a mobile telephone of FIG. 3, for example. On the upper side of fixed housing 12, there are formed operating portion 12A made up of a plurality of keys and voice input portion 12B made up of such members as a microphone. Display portion 13A formed of an LCD and the like and voice output portion 13B formed of a speaker and the like are formed on a surface of movable housing 13.

An arrow in FIG. 3 shows an opening and closing operation of movable housing 13.

Thus, the electronic apparatus is constructed by having movable housing 13 hingedly supported by folding device 10 for opening and closing with respect to fixed housing 12.

Figure 9:
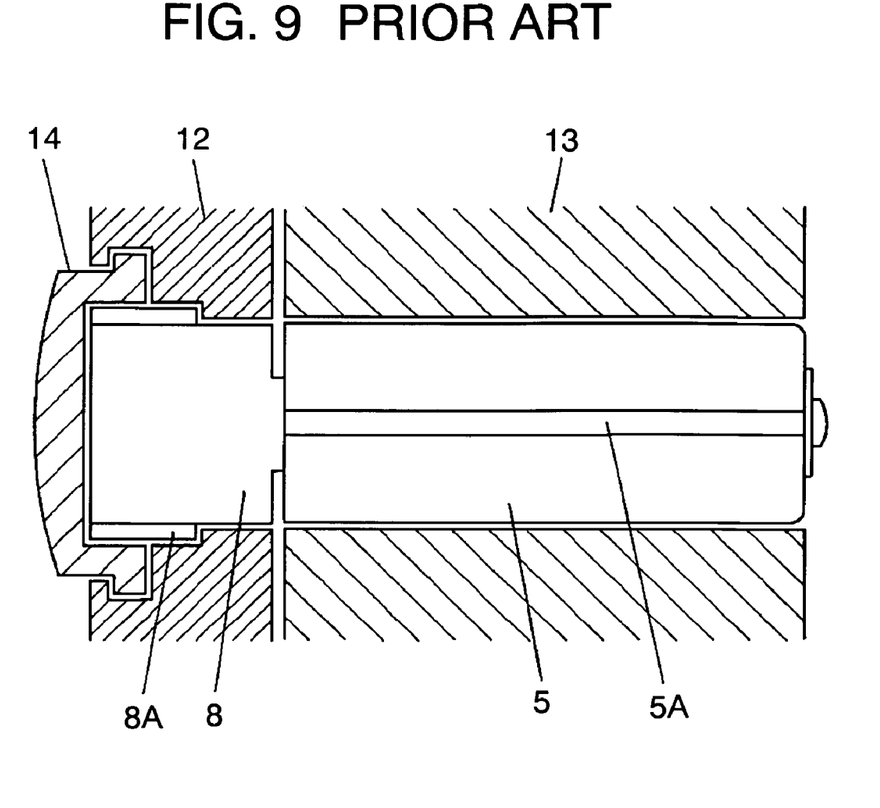
FIG. 9 is a sectional view of an integral part of a conventional folding device.

Such folding device 10 is mounted in the manner shown in a sectional view of FIG. 9. First, fixed case 8 and movable case 5 are inserted in insertion holes of fixed housing 12 and movable housing 13 so as to prevent fixed case 8 and movable case 5 from respectively rotating by means of convex wall portions 5A and 8A. A cap 14 is then mounted to a left-hand side face of fixed housing 12 to fixedly attach the folding device 10 for assembling so that the folding device 10 will not come out in the axial direction.

In the above structure, spring 6 urges movable member 3 to rotate downward, that is, in a closing direction when the tip end of movable cam 4 is in resilient contact with sloped portion 2B provided on the lower part of fixed cam 2, as shown in FIG. 7.

Accordingly, movable housing 13 to which movable case 5 is fixed is held to be closed with respect to fixed housing 12.

In such a closing state, when movable housing 13 is opened by means of a hand, movable member 3 having protrusion 3A inserted in guide groove 5B moves toward the right in movable case 5 and rotates upward through movable case 5 fixed to movable housing 13. The tip end of movable cam 4 is then in resilient contact with upper sloped portion 2C over protruded portion 2A of fixed cam 2, so that movable member 3 is urged upward, that is, in an opening direction. Movable housing 13 is thus opened.

That is to say, rotation of movable case 5 fixed to movable housing 13 allows movable member 3 to move in the axial direction, so that the tip end of movable cam 4 is in resilient contact with one of sloped portions 2B and 2C of fixed cam 2.

An opening and closing operation of movable housing 13 with respect to fixed housing 12 is arranged as described above. An example of such a folding device is disclosed in Japanese Laid-open Patent Publication No. 2002-89542.

In the conventional folding device, however, cap 14 is used for mounting after inserting folding device 10 into fixed housing 12 or movable housing 13 of an electronic apparatus, so that there are problems that components are large in number and mounting to an apparatus is troublesome.

The invention is to solve such conventional problems and to provide a folding device, which comprises a fewer number of components and which is capable of easy mounting to an apparatus, and a method of mounting the same.

SUMMARY OF THE INVENTION

The invention is to provide a folding device comprising: a fixed member having a fixed cam disposed on a side face thereof; a movable member arranged for rotation with respect to the fixed member and having a movable cam disposed on a face thereof in confronting relation with the fixed cam; and a movable case in a substantially cylindrical shape for housing the fixed member and the movable member, the movable case having formed on an outer periphery thereof a convex wall portion or a concave groove portion; wherein a holding member is rotatably mounted to an end portion of the movable case.

DETAILED DESCRIPTION OF PREFERRED EMBODIMENTS

An embodiment of the invention will be described below with reference to FIG. 1 to FIG. 6. The drawings are schematic views and do not necessarily show each dimension and position exactly. In the sectional views in the drawings, dimensions in the radial direction are shown increased to make a relationship between a fixed cam and a movable cam easy to understand.

Corresponding components to those of the configurations described in the background art are denoted by like reference numerals and detailed description of the same will be simplified.

A mobile telephone is shown as an example of an electronic apparatus of the invention. The invention is, however, not limited to the above.

Embodiments

Figure 1:
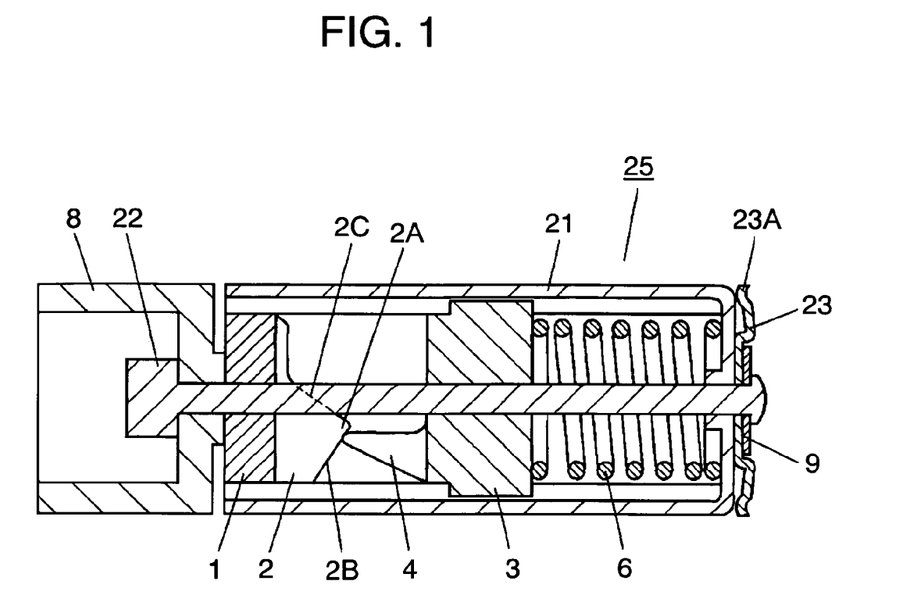
FIG. 1 is a sectional view of a folding device according to an embodiment of the invention.
Figure 2:
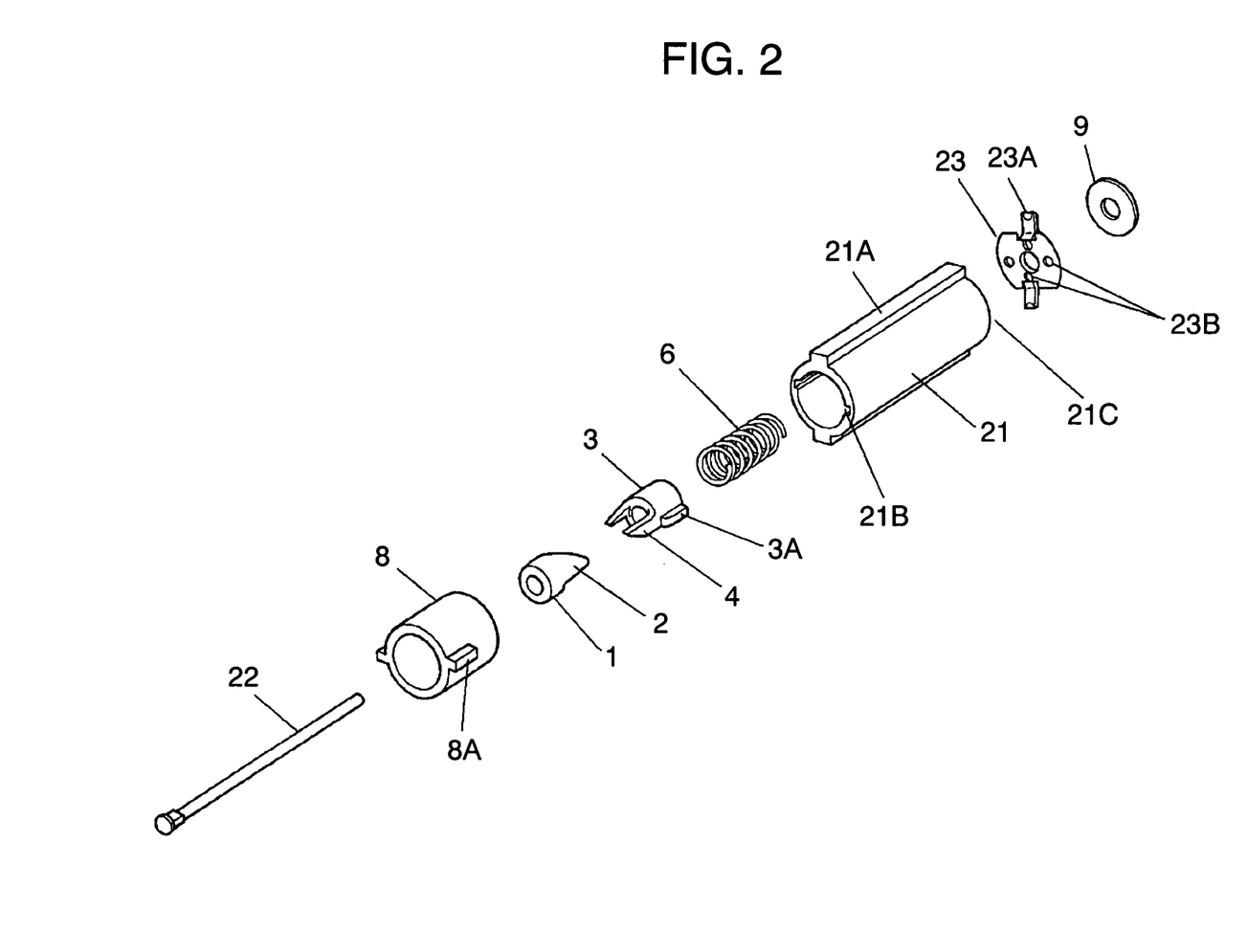
FIG. 2 is an exploded view in perspective of the folding device according to the embodiment of the invention.

As shown in FIG. 1 and FIG. 2, fixed member 1 is in a substantially cylindrical shape and made of steel, copper alloy or the like. Fixed member 1 is formed with fixed cam 2 on an outer periphery of its right-hand side face (as shown in FIG. 1). Fixed cam 2 comprises protruded portion 2A and two sloped portions 2B and 2C extending upwardly and downwardly from protruded portion 2A. Movable member 3, similarly in a substantially cylindrical shape and made of metal, is arranged for rotation in an opening and closing direction with respect to fixed member 1. Movable member 3 is provided with movable cam 4 on an outer periphery of its left-hand side face (as shown in FIG. 1) in confronting relation with fixed cam 2.

Movable case 21, which is in a substantially cylindrical shape and made of sintered alloy, is provided with convex wall portion 21A sticking outward on its outer periphery and guide groove 21B on its inner periphery. Protrusion 3A provided on the outer periphery of movable member 3 is inserted into guide groove 21B to movably hold movable member 3 for movement in the axial direction. Further, coil spring 6 is mounted so as to be weakly pre-compressed in a space between a right-hand side face of movable member 3 and a right-hand bottom face of movable case 21. Spring 6 urges movable member 3 toward the left, and thereby, a tip end of movable cam 4 is in resilient contact with sloped portion 2B of fixed cam 2.

Fixed case 8, which is in a substantially cylindrical shape, and fixed member 1 are fixed to a left end portion of fixed shaft 22 in a substantially circular pillar shape. Moreover, a right end portion of fixed shaft 22 passes through a hollow portion of movable member 3 and spring 6 to be rotatably mounted to a right-hand side face of movable case 21 by means of locking ring 9.

Holding member 23, which is in a substantially ring shape and formed from a resilient metal thin plate such as steel, copper alloy or the like, comprises protruded portion 23A in the shape of a tongue, which extends outward.

Protruded portion 23A is weakly pre-compressed in the axial direction to be in resilient contact with an end portion of wall portion 21A of movable case 21 and is rotatably mounted between the right-hand side face (as shown in FIG. 1) of movable case 21 and locking ring 9.

A plurality of concave engagement portions 23B are provided at roots of protruded portions 23A of holding member 23 and at places in a substantially orthogonal direction.

Engagement portion 23B engages with convex engagement portion 21C formed on the right-hand side face of movable case 21.

Further, fixed case 8 provided on its outer periphery with convex wall portion 8A is rotatably mounted to the left-hand side face of movable case 21 by means of fixed shaft 22. Folding device 25 is thus constructed with fixed member 1, movable member 3, spring 6 and the like housed in movable case 21.

Folding device 25 can be mounted to an electronic apparatus in the following manner.

As shown in a perspective view of a mobile telephone of FIG. 3, fixed case 8 is fixedly attached to fixed housing 12 while movable case 21 is fixedly attached to movable housing 13. On the upper face of fixed housing 12, there are formed operating portion 12A made up of a plurality of keys and voice input portion 12B made up of such members as a microphone. Display portion 13A formed of an LCD and the like and voice output portion 13B formed of a speaker and the like are formed on a surface of movable housing 13.

Thus, the electronic apparatus is constructed by having movable housing 13 hingedly supported by folding device 25 for opening and closing with respect to fixed housing 12.

A method of mounting folding device 25 to an electronic apparatus will be described below.

Figure 4:
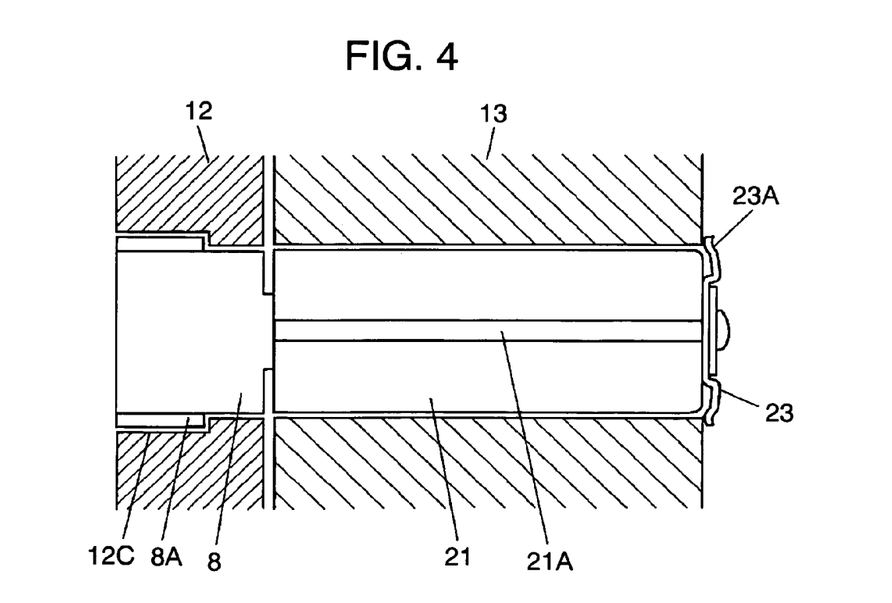
FIG. 4 is a sectional view of an integral part of a folding device according to the embodiment of the invention.

First, as shown in FIG. 4, fixed case 8 and movable case 21 are inserted in insertion holes of fixed housing 12 and movable housing 13. Fixed case 8 and movable case 9 are prevented from rotating relative to fixed housing 12 and movable housing 13, respectively, by means of convex wall portions 8A and 21A.

Figure 5A:
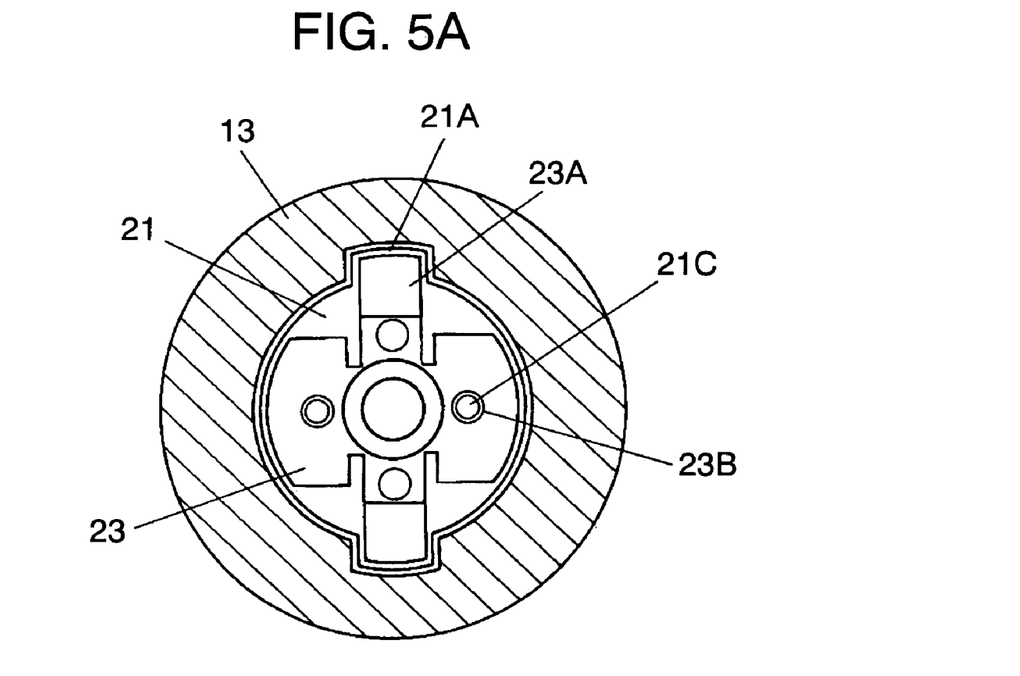
FIGS. 5A and 5B are side sectional views of a folding device according to the embodiment of the invention.

In mounting the folding device to the electronic apparatus, protruded portion 23A in the shape of a tongue, which extends toward an outside of holding member 23 in an upward and downward direction (as shown in FIGS. 1 and 5A), is in resilient contact with an end portion of wall portion 21A disposed at upper and lower parts of movable case 21, as shown in FIG. 5A. Concave engagement portions 23B provided at places in a substantially orthogonal direction with respect to protruded portions 23A engage with convex engagement portion 21C formed on the left and right sides of an end portion of movable case 21 (as shown in FIG. 5A).

Holding member 23 is held in movable case 21 in such a state as described above.

Figure 5B:
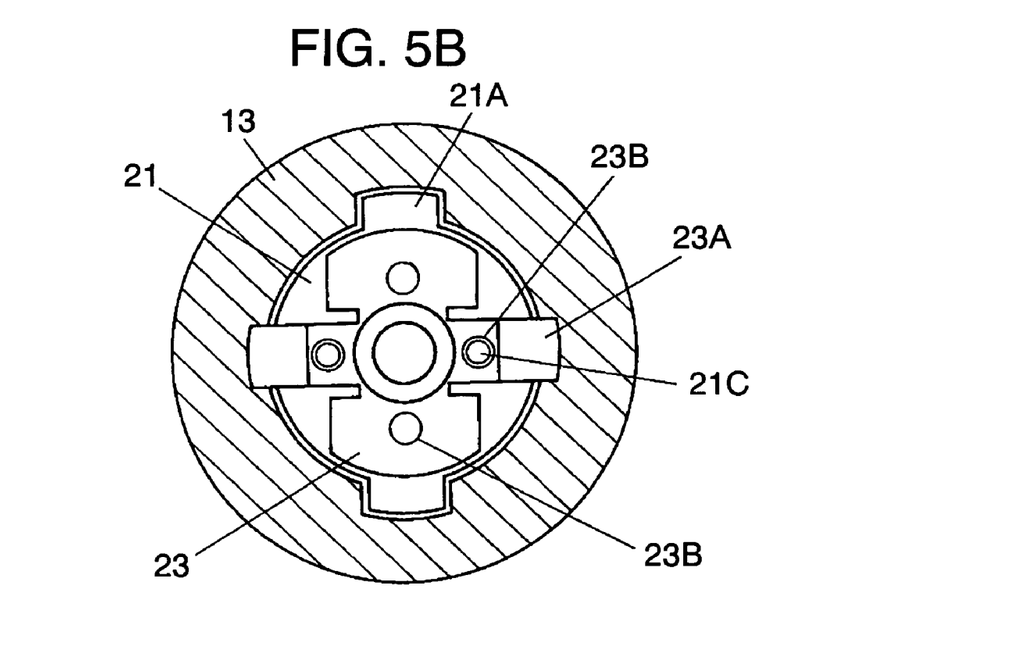

When holding member 23 is then rotated about 90 degrees clockwise, for example, protruded portion 23A is rotated to be away from wall portion 21A and stick out from the outer periphery of movable case 21 to be in resilient contact with an end portion of the right-hand side face of movable housing 13 as shown in FIG. 4 and FIG. 5B. Accordingly, a right end of wall portion 8A of fixed case 8 is engaged with mounting groove 12C of fixed housing 12. Thus, folding device 25 is urged toward the right (in FIG. 4) so that movable case 21 is fixedly held in movable housing 13.

At the same time, engagement portions 23B disposed in places in a substantially orthogonal direction with respect to protruded portions 23A are released from engagement with engagement portions 21C disposed on the left and right sides (in FIG. 5B) of an end portion of movable case 21 while engagement portions 23B disposed at roots of protrusions 23A engage with engagement portions 21C.

In the above state, holding member 23 is held in movable case 21.

That is to say, folding device 25 is constructed with holding member 23 rotatably mounted to an end portion of movable case 21. On the other hand, after movable case 21 is inserted in movable housing 13, holding member 23 is rotated so that protruded portion 23A sticking out from the outer periphery of movable case 21 is in resilient contact with an end portion of the right-hand side face (in FIG. 4) of movable housing 13.

Folding device 25 is arranged to be fixedly held in movable housing 13 as described above.

Further, before the mounting to movable housing 13, engagement portions 23B disposed in a substantially orthogonal direction with respect to protruded portion 23A engage with engagement portions 21C disposed on the left and right sides (in FIG. 4) of an end portion of movable case 21 to maintain a state in which protruded portion 23A in the shape of a tongue is in resilient contact with an end portion of wall portion 21A disposed at upper and lower parts of movable case 21.

After holding member 23 is rotated for the mounting to movable housing 13, engagement portions 23B disposed at roots of protruded portions 23A engage with engagement portions 21C to maintain a state in which protruded portion 23A sticks out from the outer periphery of movable case 21 to be in resilient contact with an end portion of the right-hand side face (in FIG. 4) of movable housing 13.

In the above structure, spring 6 urges movable member 3 downward, that is, in a closing direction when a tip end of movable cam 4 is in resilient contact with sloped portion 2B provided on the lower side of fixed cam 2, as shown in FIG. 1.

Accordingly, movable housing 13 to which movable case 21 is fixed is held to be closed with respect to fixed housing 12.

When movable housing 13 is opened by means of a hand from the above closed state, movable member 3 having protruded portion 3A inserted in guide groove 21B moves toward the right in movable case 21 (in FIGS. 1 and 4) and rotates upward through movable case 21, which is fixed to movable housing 13. Then, the tip end of movable cam 4 becomes in resilient contact with upper sloped portion 2C over protruded portion 2A of fixed cam 2 to urge movable member 3 upward, that is, in an opening direction, so that movable housing 13 is opened.

That is to say, movable member 3 is moved in the axial direction by rotating movable case 21 fixed to movable housing 13 so that the tip end of movable cam 4 is in resilient contact with one of sloped portions 2B and 2C of fixed cam 2.

An opening and closing operation of movable housing 13 with respect to fixed housing 12 is arranged as described above.

Thus, according to the embodiment, folding device 25 is constructed with holding member 23 rotatably mounted to a tip end of movable case 21, which is provided on its outer periphery a convex wall portion 21A and houses fixed member 1 and movable member 3. After movable case 21 is inserted in movable housing 13, holding member 23 provided in folding device 25 is rotated to fix movable case 21 to movable housing 13. It is thus possible to provide a folding device, which comprises a fewer number of components and is low in cost and can be easily mounted to various kinds of electronic apparatuses, and a method of mounting the same. Protruded portion 23A extended outward is provided in holding member 23 while holding member 25 is rotated so that protruded portion 23A sticks (i.e. protrudes) out from the outer periphery of movable case 21. Accordingly, protruded portion 23A in the shape of a tongue, which sticks out, is in resilient contact with an end portion of the right-hand side face of movable housing 13. Such resilient contacting power allows movable case 21 to be fixedly held in movable housing 13, so that mounting to an apparatus can be reliably performed.

Further, a plurality of concave or convex engagement portions 23B and 21C are provided on end portions of holding member 23 and movable case 21. Accordingly, before or after rotation of holding member 23, engagement with engagement portions 23B and 21C allows holding member 23 to be held at a predetermined angle.

It is thus possible to prevent a difference in position of holding member 23 from occurring before or after mounting and to carry out the mounting to an apparatus easily and reliably.

In the above description, a configuration has been described in which protruded portion 23A extended outward from holding member 23 is in resilient contact with an end portion of convex wall portion 21A provided on the outer periphery of movable case 21 and holding member 23 is rotated so that protruded portion 23A sticks out from the outer periphery of movable case 21.

Figure 6:
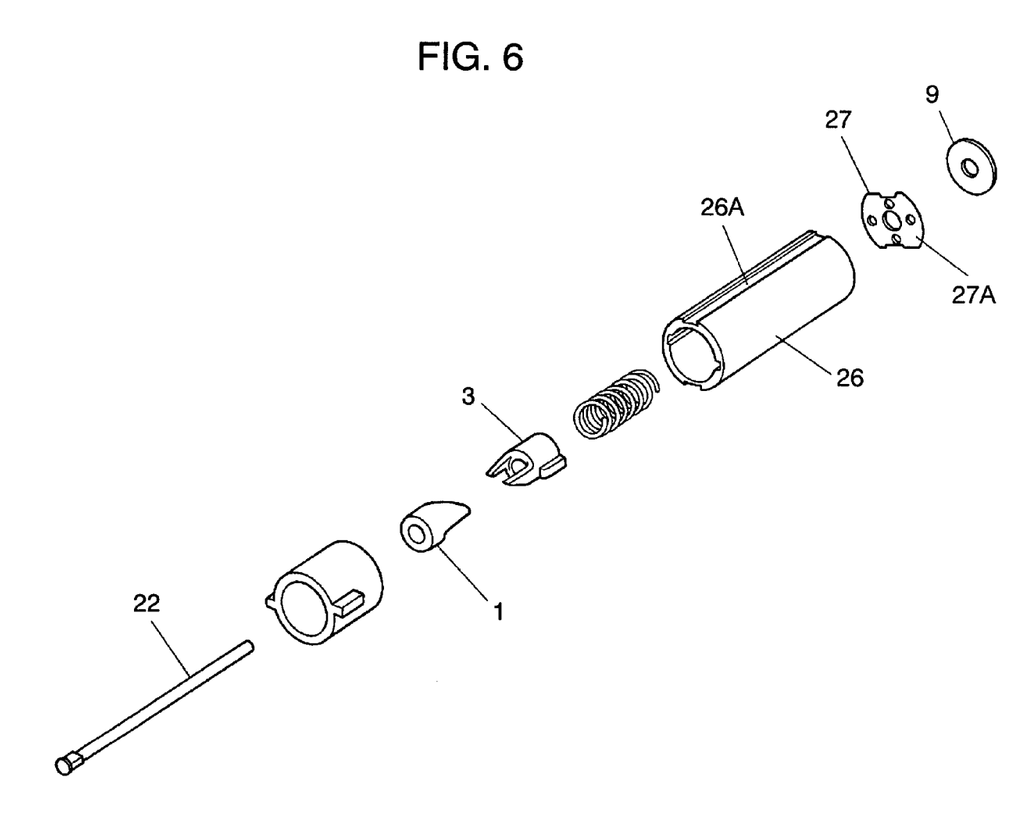
FIG. 6 is an exploded view in perspective of another folding device according to a modified embodiment of the invention.

In other cases, movable case 26 may be formed with concave groove portion 26A and holding member 27 may be rotated so that protruded portion 27A sticks out from groove portion 26A to fixedly hold movable case 26 in movable housing 13, as shown in FIG. 6.

Moreover, locking ring 9 for mounting the right end portion of fixed shaft 22 to the right-hand side face of movable case 21 may be formed from a resilient metal thin plate such as steel, copper alloy or the like to be formed into one body with holding member 23 or 27. This can further reduce the number of components, so that the folding device can be lower in cost.

The invention has the following effects.

A folding device is constructed with a holding member mounted rotatably on an end portion of a movable case, which is formed with a convex wall portion or a concave groove portion on its outer periphery and which houses a fixed member and a movable member. Then, after the folding device is inserted in a fixed housing or a movable housing of an electronic apparatus, the holding member provided in the folding device is rotated so that the folding device can be mounted to the apparatus. Therefore, a folding device, which comprises a fewer number of components, which is low in cost and which is easily mounted to an apparatus, can be obtained.

Further, a protruded portion extended outward is provided in a holding member and the holding member is rotated so that the protruded portion sticks out from the outer periphery of a movable case or a groove portion. The protruded portion in the shape of a tongue, which sticks out, is in resilient contact with a movable housing. Such resilient contacting power allows the movable case to be fixedly held in the movable housing.

Accordingly, mounting to an apparatus can be certainly performed.

Moreover, a plurality of concave or convex engagement portions are provided on an end portion of a movable case and a holding member, so that engagement of those engagement portions allows the holding member to be held at a predetermined angle, before or after rotation of the holding member. Accordingly, it is possible to prevent a difference in position of the holding member from occurring before or after the mounting to an apparatus and to carry out mounting easily and reliably.

A movable case is inserted in a movable housing, and then, a holding member is rotated to fix the movable case in the movable housing for mounting a folding device. Therefore, it is possible to provide a method of mounting a folding device, which comprises a fewer number of components, which is low in cost and which is easily mounted to an apparatus.

The folding device and the method of mounting the same can be thus widely applied to various kinds of electronic apparatuses.

What is claimed is:

1. A folding device comprising:
a fixed member having a fixed cam disposed on a side face thereof;
a movable member arranged for rotation with respect to said fixed member and having a movable cam disposed on a face thereof in confronting relation with said fixed cam;
a movable case, having a substantially cylindrical shape, housing said fixed member and said movable member such that said fixed member is rotatable relative to said movable case, said movable case formed on an outer periphery thereof with one of a convex wall portion and a concave groove portion;
a movable housing, said movable case being insertable in said movable housing; and
a holding member rotatably mounted to an end portion of said movable case;
wherein said holding member is provided with a protruded portion extending outward;
wherein said holding member is rotatable to a position in which said protruded portion protrudes outwardly beyond one of said outer periphery of said movable case and said concave groove portion of said movable case; and
wherein said movable housing is configured such, that when said movable case is inserted in said movable housing and said holding member is rotated so that said protruded portion protrudes outward beyond said one of said outer periphery of said movable case and said concave groove portion, said movable case is fixedly attached to said movable housing by said holding member.

2. A folding device comprising:
a fixed member having a fixed cam disposed on a side face thereof;
a movable member arranged for rotation with respect to said fixed member and having a movable cam disposed on a face thereof in confronting relation with said fixed cam;
a movable case having a substantially cylindrical shape, housing said fixed member and said movable member such that said fixed member is rotatable relative to said movable case, said movable case formed on an outer periphery thereof with one of a convex wall portion and a concave groove portion; and
a holding member rotatably mounted to an end portion of said movable case;
wherein said holding member is provided with a protruded portion extending outward;
wherein said holding member is rotatable to a position in which said protruded portion protrudes outwardly beyond one of said outer periphery of said movable case and said concave groove portion of said movable case; and
wherein said end portion of said movable case and said holding member are provided with mutually engageable concave and convex engagement portions.

3. A method of mounting a folding device, the folding device comprising:
a fixed member having a fixed cam disposed on a side face thereof,
a movable member arranged for rotation with respect to the fixed member and having a movable cam disposed on a face thereof in confronting relation with the fixed cam,
a movable case, having a substantially cylindrical shape, housing the fixed member and the movable member such that said fixed member is rotatable relative to said movable case, the movable case formed on an outer periphery thereof with one of a convex wall portion and a concave groove portion, and
a holding member rotatably mounted to an end portion of the movable case,
wherein the holding member is provided with a protruded portion extending outward, and
wherein the holding member is rotatable to a position in which the protruded portion protrudes outward beyond one of the outer periphery of the movable case and the concave groove portion of the movable case,
said method of mounting the folding device comprising:
inserting the movable case in a movable housing; and
after said inserting of the movable case in the movable housing, rotating the holding member such that the protruded portion protrudes beyond said one of the outer periphery of the movable case and the concave groove portion of the movable case to fixedly attach the movable case to the movable housing.

4. The method according to claim 3, wherein said fixed member is housed in said movable case at a first end thereof, and said holding member is disposed outside said movable case at a second end thereof opposite said first end.

5. The folding device according to claim 1, wherein said fixed member is housed in said movable case at a first end thereof, and said holding member is disposed outside said movable case at a second end thereof opposite said first end.

6. A method of mounting a folding device, the folding device comprising:
a fixed member having a fixed cam disposed on a side face thereof,
a movable member arranged for rotation with respect to the fixed member and having a movable cam disposed on a face thereof in confronting relation with the fixed cam,
a movable case, having a substantially cylindrical shape, housing the fixed member and the movable member such that said fixed member is rotatable relative to said movable case, the movable case formed on an outer periphery thereof with one of a convex wall portion and a concave groove portion, and a movable housing, said movable case being insertable in said movable housing, and a holding member rotatably mounted to an end portion of the movable case, wherein the holding member is provided with a protruded portion extending outward, wherein the holding member is rotatable to a position in which the protruded portion protrudes outward beyond one of the outer periphery of the movable case and the concave groove portion of the movable case, and wherein said movable housing is configured such, that when said movable case is inserted in said movable housing and said holding member is rotated so that said protruded portion protrudes outward beyond said one of said outer periphery of said movable case and said concave groove portion, said movable case is fixedly attached to said movable housing by said holding member, said method of mounting the folding device comprising:

inserting the movable case in a movable housing; and rotating the holding member such that the protruded portion protrudes beyond said one of the outer periphery of the movable case and the concave groove portion of the movable case to fixedly attach the movable case to the movable housing.

7. The method according to claim 6, wherein said fixed member is housed in said movable case at a first end thereof, and said holding member is disposed outside said movable case at a second end thereof opposite said first end.

8. A method of mounting a folding device, the folding device comprising:

a fixed member having a fixed cam disposed on a side face thereof, a movable member arranged for rotation with respect to the fixed member and having a movable cam disposed on a face thereof in confronting relation with the fixed cam, a movable case, having a substantially cylindrical shape, housing the fixed member and the movable member such that said fixed member is rotatable relative to said movable case, the movable case formed on an outer periphery thereof with one of a convex wall portion and a concave groove portion, and a holding member rotatably mounted to an end portion of the movable case, wherein the holding member is provided with a protruded portion extending outward, wherein the holding member is rotatable to a position in which the protruded portion protrudes outward beyond one of the outer periphery of the movable case and the concave groove portion of the movable case, and wherein said end portion of said movable case and said holding member are provided with mutually engageable concave and convex engagement portions, said method of mounting the folding device comprising:

inserting the movable case in a movable housing; and rotating the holding member such that the protruded portion protrudes beyond said one of the outer periphery of the movable case and the concave groove portion of the movable case to fixedly attach the movable case to the movable housing.

9. The method according to claim 3, wherein said rotating of the holding member comprises rotating the holding member such that the protruded portion protrudes beyond said one of the outer periphery of the movable case and the concave groove portion of the moveable case to engage against the movable housing.

10. The method according to claim 9, wherein said rotating of the holding member comprises rotating the holding member relative to the movable housing.

11. The method according to claim 3, wherein said rotating of the holding member comprises rotating the holding member relative to the movable housing.

* * * * *